United States Patent
Kitta et al.

(10) Patent No.: US 9,517,580 B2
(45) Date of Patent: Dec. 13, 2016

(54) NOZZLE TOUCH MECHANISM AND INJECTION MOLDING MACHINE

(71) Applicant: Toshiba Kikai Kabushiki Kaisha, Chiyoda-ku, Tokyo-to (JP)

(72) Inventors: Hideaki Kitta, Numazu (JP); Toshihiro Kasai, Numazu (JP)

(73) Assignee: TOSHIBA KIKAI KABUSHIKI KAISHA, Tokyo-To (JP)

( * ) Notice: Subject to any disclaimer, the term of this patent is extended or adjusted under 35 U.S.C. 154(b) by 0 days.

(21) Appl. No.: 14/412,958

(22) PCT Filed: Jul. 3, 2013

(86) PCT No.: PCT/JP2013/068371
§ 371 (c)(1),
(2) Date: Jan. 5, 2015

(87) PCT Pub. No.: WO2014/007329
PCT Pub. Date: Jan. 9, 2014

(65) Prior Publication Data
US 2015/0158222 A1   Jun. 11, 2015

(30) Foreign Application Priority Data
Jul. 5, 2012  (JP) ................................. 2012-151607

(51) Int. Cl.
*B29C 45/07* (2006.01)
*B29C 45/17* (2006.01)
*B29L 31/00* (2006.01)

(52) U.S. Cl.
CPC ... *B29C 45/1777* (2013.01); *B29C 2045/1778* (2013.01); *B29L 2031/757* (2013.01)

(58) Field of Classification Search
CPC .................. B29C 45/1777; B29C 2045/1778; B29L 2031/757

(Continued)

(56) References Cited

U.S. PATENT DOCUMENTS 4,676,730 A * 6/1987 Yamasaki ........... B29C 45/1777
264/328.11
4,950,144 A * 8/1990 Watanabe ........... B29C 45/1777
264/328.11
(Continued)

FOREIGN PATENT DOCUMENTS

AT    229 009    8/1963
DE    38 84 183  1/1994
(Continued)

OTHER PUBLICATIONS

English Language Abstract of JP 2001-038764 published Feb. 13, 2011.
(Continued)

*Primary Examiner* — Yogendra Gupta
*Assistant Examiner* — Emmanuel S Luk
(74) *Attorney, Agent, or Firm* — DLA Piper LLP (US)

(57) ABSTRACT

A nozzle touch mechanism (50) includes a base frame (6), a stationary platen (4) to which a mold (5) is to be attached, and an injection mechanism (1). The injection mechanism (1) is moved it toward the stationary platen (4) by means of a ball screw shaft (11). A motor portion (14) which applies a pressing force to the mold (5) from a nozzle (3) is connected to one end (11a) of the ball screw shaft (11). A connection mechanism (7) is provided which is connected to the other end (11b) of the ball screw shaft (11) and to the stationary platen (4) at a support located above the center of the nozzle (3). When no pressing force is applied to the mold (5) from the nozzle (3) by the motor portion (14), springs (18) can press the connection mechanism (7) in such a direction as to move it away from the stationary platen (4) with respect to the base frame (6).

8 Claims, 20 Drawing Sheets

(58) Field of Classification Search
USPC .......................................................... 425/569
See application file for complete search history.

(56) References Cited

U.S. PATENT DOCUMENTS

| | | | | |
|---|---|---|---|---|
| 5,143,736 | A * | 9/1992 | Kumamura et al. .......... | 425/569 |
| 5,147,659 | A * | 9/1992 | Watanabe ............ | B29C 45/1777 |
| | | | | 425/145 |
| 5,804,224 | A * | 9/1998 | Inaba ................. | B29C 45/1777 |
| | | | | 425/150 |
| 6,163,130 | A | 12/2000 | Neko et al. | |
| 6,425,753 | B1 * | 7/2002 | Eppich ................ | B29C 45/5008 |
| | | | | 425/574 |
| 6,524,095 | B1 * | 2/2003 | Ito ...................... | B29C 45/1777 |
| | | | | 425/574 |
| 6,936,214 | B2 * | 8/2005 | Schaffer .............. | B29C 45/1777 |
| | | | | 264/328.11 |
| 7,214,049 | B2 * | 5/2007 | Nagaya ............... | B29C 45/1777 |
| | | | | 264/40.7 |
| 7,270,525 | B2 * | 9/2007 | Nagaya ............... | B29C 45/1777 |
| | | | | 425/149 |
| 2003/0219509 | A1 * | 11/2003 | Yoshioka ............ | B29C 45/1777 |
| | | | | 425/594 |
| 2005/0084556 | A1 * | 4/2005 | Yoshioka ............ | B29C 45/1777 |
| | | | | 425/149 |
| 2006/0127528 | A1 * | 6/2006 | Schmidt ................. | B29C 45/07 |
| | | | | 425/574 |
| 2007/0224308 | A1 | 9/2007 | Nishimura | |
| 2009/0011064 | A1 * | 1/2009 | Satou ............................ | 425/150 |
| 2012/0128813 | A1 * | 5/2012 | Takemoto et al. ............ | 425/574 |
| 2014/0088757 | A1 * | 3/2014 | Inami et al. ................. | 700/200 |
| 2014/0161925 | A1 * | 6/2014 | Yoshioka ...................... | 425/569 |

FOREIGN PATENT DOCUMENTS

| | | |
|---|---|---|
| DE | 698 21 185 | 6/2004 |
| DE | 600 14 808 | 2/2005 |
| DE | 11 2006 001 060 | 5/2008 |
| JP | 2000-289069 | 10/2000 |
| JP | 2001-38764 | 2/2001 |
| JP | 2003-011162 | 1/2003 |
| JP | 2010-241076 | 10/2010 |
| JP | 2012-011767 | 1/2012 |

OTHER PUBLICATIONS

English Language Translation of JP 2001-038764 published Feb. 13, 2011.
German Office Action issued in DE 10 2010 054 606.2 on Jun. 18, 2012.
English Language Translation of German Office Action issued in DE 10 2010 054 606.2 on Jun. 18, 2012.
English Language Abstract of DE 600 14 808 published on Feb. 17, 2005.
English Language Abstract of DE 11 2006 001 060 published on May 29, 2008.
English Language Abstract of JP 2010-241076 published on Oct. 28, 2010.
English Language Translation of JP 2010-241076 published on Oct. 28, 2010.
International Search Report issued in PCT/JP2013/068371 dated Oct. 8, 2013.
English Language Abstract and Translation for JP 2003-011162 published on Jan. 1, 2003.
English Language Abstract and Translation for JP 2012-011767 published Jan. 19, 2012.
English Language Abstract and Translation for JP 2000-289069 published Oct. 17, 2000.
International Preliminary Report on Patentability issued in PCT/JP2013/068371dated Jan. 6, 2015 with translation.
Written Opinion of the International Search Authority issued in PCT/JP2013/068371 dated Oct. 10, 2013.
Related U.S. Appl. No. 12/970,703.
German Office Action issued in DE 11 2013 003 362.3 dated Oct. 6, 2015 with English Language Translation.
English Language Translation for AT 229 009B published Aug. 26, 1963.
Chinese Office Action issued in CN 201380004051.5 on Feb. 2, 2016 with English Language Translation.

* cited by examiner

US 9,517,580 B2

NOZZLE TOUCH MECHANISM AND INJECTION MOLDING MACHINE

CROSS REFERENCE TO RELATED APPLICATIONS

This application is a U.S. National Stage Application of International Application No. PCT/JP2013/068371 filed Jul. 4, 2013, which claims priority from Japanese Patent Application No. 2012-151607 filed Jul. 5, 2012. The entirety of all the above-listed applications are incorporated herein by reference.

TECHNICAL FIELD

The present invention relates to a nozzle touch mechanism and an injection molding machine.

BACKGROUND ART

In an injection molding machine, when molten material is to be injected into a mold attached to a stationary platen as a part of a mold clamping mechanism, typically an injection mechanism is moved toward the mold clamping mechanism; a nozzle of a heating cylinder mounted on a leading end of the injection mechanism is brought into contact (also referred to as "nozzle touch") with the mold attached to the stationary platen as a part of the mold clamping mechanism; and the molten material is injected into the mold while a pressure (also referred to as a "nozzle touch force") is applied to the nozzle.

The injection molding machine therefore has a nozzle touch mechanism for applying the nozzle touch force to the stationary platen.

A known injection molding machine has a nozzle touch mechanism that includes a sliding section, mounted with an injection mechanism, for making the injection mechanism movable and a driving section for moving the injection mechanism along the sliding section. The injection molding machine further includes a connection mechanism having one end supported on a stationary platen and the other end supported on the driving section of the nozzle touch mechanism. The connection mechanism is supported on the stationary platen at least two points that are disposed at symmetrical positions relative to a central axis of a nozzle. The nozzle touch force is thereby transmitted to the nozzle touch mechanism via the connection mechanism. Such a configuration prevents the stationary platen and a mold attached to the stationary platen from being tilted by the nozzle touch force. (For example, see JP-2001-38764-A.)

However, the injection molding machine described in JP-2001-38764-A is based on the premise that the mold is attached to the stationary platen. In addition to this premise, the stationary platen and the mold attached to the stationary platen are prevented from being tilted due to the nozzle touch force. In the injection molding machine described in JP-2001-38764-A, the stationary platen tilted when the mold is attached to the stationary platen is not taken into consideration. Thus, mold opening and closing operation, injection operation, dwelling operation, and cooling operation may be performed in some cases while the stationary platen and the mold attached to the stationary platen are still tilted.

The inventors developed the injection molding machine that can prevent the stationary platen and the mold attached to the stationary platen from being tilted for a period of time during which the nozzle touch force is applied (refer to JP-2012-11767-A). The tilt (the bending moment) of the stationary platen occurring when the mold is attached to the stationary platen is also taken account of in this injection molding machine. The tilt of the stationary platen and the mold attached thereto is avoided for the period of time during which the nozzle touch force is applied.

PRIOR ART DOCUMENTS

Patent Documents

Patent document 1: JP-2001-38764-A
Patent document 2: JP-2012-11767-A

In the injection molding machine described in JP-2012-11767-A, the stationary platen and the mold attached thereto can be prevented from being tilted while the nozzle touch force is applied. However, the period of time during which no nozzle touch force is applied is not taken into consideration. It is likely not to prevent the tilt of the stationary platen and the mold attached thereto for the period of time during which no nozzle touch force is applied.

In other words, the stationary platen remains tilted due to the tilt (the bending moment) of the stationary platen at the time of the mold being attached to the stationary platen while no nozzle touch force is applied. As a result, the stationary platen is continuously subjected to a load because of the tilt (the bending moment) of the stationary platen occurring when the mold is attached to the stationary platen for the period of time during which no nozzle touch force is applied. The stationary platen could be deformed due to aged deterioration—an aging load resulting from the tilt (the bending moment) of the stationary platen occurring while the mold is attached to the stationary platen in the state where no nozzle touch force is applied. If mold-closing is performed with the stationary platen remaining tilted, a guide pin and the like come into contact another mold since the mold is also tilted, such that scoring or breakage may probably occur.

The present invention has been made in such situations and aims to provide a nozzle touch mechanism and an injection molding machine that can prevent a stationary platen and a mold attached to the stationary platen from being tilted not only for a period of time during which a nozzle touch force is applied but while no nozzle touch force is applied.

The "period of time during which a nozzle touch force is applied" refers to a period when the following steps of a typical injection molding cycle S100 as shown in FIG. 21 are being performed after a mold closing or clamping operation in a mold clamping step S101: an injection step S102, a dwelling step S103, a cooling step S104 and the completion of application of the nozzle touch force in a mold opening step S105.

The molding clamping S101 here is a step where the mold is clamped. An injection molding machine normally uses a drive unit operated by any power source other than hydraulic pressure, such as an electric power, to close the mold and uses a hydraulic drive to clamp the mold. The mold clamping step S101, however, may be divided into two sub-steps of closing the mold (mold closing sub-step) and clamping the mold (mold clamping sub-step).

When the injection molding cycle S100 is performed consecutively; in other words, when an injection molding operation is consecutively performed, the nozzle touch force, once applied, may be continuously applied until a consecutive operation of the injection molding cycle S100 is completed, instead of applying the nozzle touch force for each cycle, in order to shorten the injection molding cycle S100.

DISCLOSURE OF THE INVENTION

The present invention is a nozzle touch mechanism. This nozzle touch mechanism includes: a base frame; a stationary platen fixed to the base frame, to which a mold is to be attached; an injection mechanism capable of moving in such a direction as to move it toward and away from the stationary platen; a nozzle attached to the injection mechanism; a movement mechanism which moves the injection mechanism in such a direction as to move it toward and away from the stationary platen; a drive mechanism connected to one end of the movement mechanism and applies a pressing force to the mold from the nozzle by making the injection mechanism move toward the stationary platen; a connection mechanism connected to the movement mechanism and directly or indirectly connected to the stationary platen at a support located above the center of the nozzle; and an elastic body which makes it possible to press the connection mechanism in such a direction as to move it away from the stationary platen with respect to the base frame when no pressing force is applied to the mold from the nozzle by the drive mechanism.

The present invention is a nozzle touch mechanism including: a nut portion movable relatively to the movement mechanism; and the elastic body having one end connected to the connection mechanism via a rod and the other end attached to the nut portion.

The present invention is a nozzle touch mechanism including: a nut portion movable relatively to the movement mechanism; and the elastic body having one end connected to the connection mechanism via a rod and the nut portion and the other end attached to the movement mechanism.

The present invention is a nozzle touch mechanism including the elastic body having one end attached to the base frame and the other end connected to the connection mechanism.

The present invention is a nozzle touch mechanism including an elevation device being provided on at least one of the connection mechanism and the stationary platen, the elevation device making adjustable a height-wise position of the support.

The present invention is a nozzle touch mechanism including a preload adjusting mechanism which adjusts a preload of the elastic body.

The present invention is a nozzle touch mechanism including a booster mechanism for enlarging a preload of the elastic body.

The present invention is an injection molding machine including the nozzle touch mechanism.

According to the present invention, the connection mechanism is connected to the stationary platen at the support located above the center of the nozzle. The elastic body is provided which makes it possible to press the connection mechanism in such a direction as to move it away from the stationary platen with respect to the base frame when no pressing force is applied to the mold through the drive mechanism. The stationary platen and the mold attached to the stationary platen can be prevented from being tilted not only for a period of time during which the nozzle touch force is applied but also for a period of time during which the nozzle touch force is not applied as a result.

MODE FOR CARRYING OUT THE INVENTION

First Embodiment

A first embodiment of the present invention will hereinafter be described with reference to the drawings.

A configuration of a nozzle touch mechanism of an injection molding machine according to a first embodiment of the present invention will be described with reference to FIGS. 1 to 7.

Figure 1:
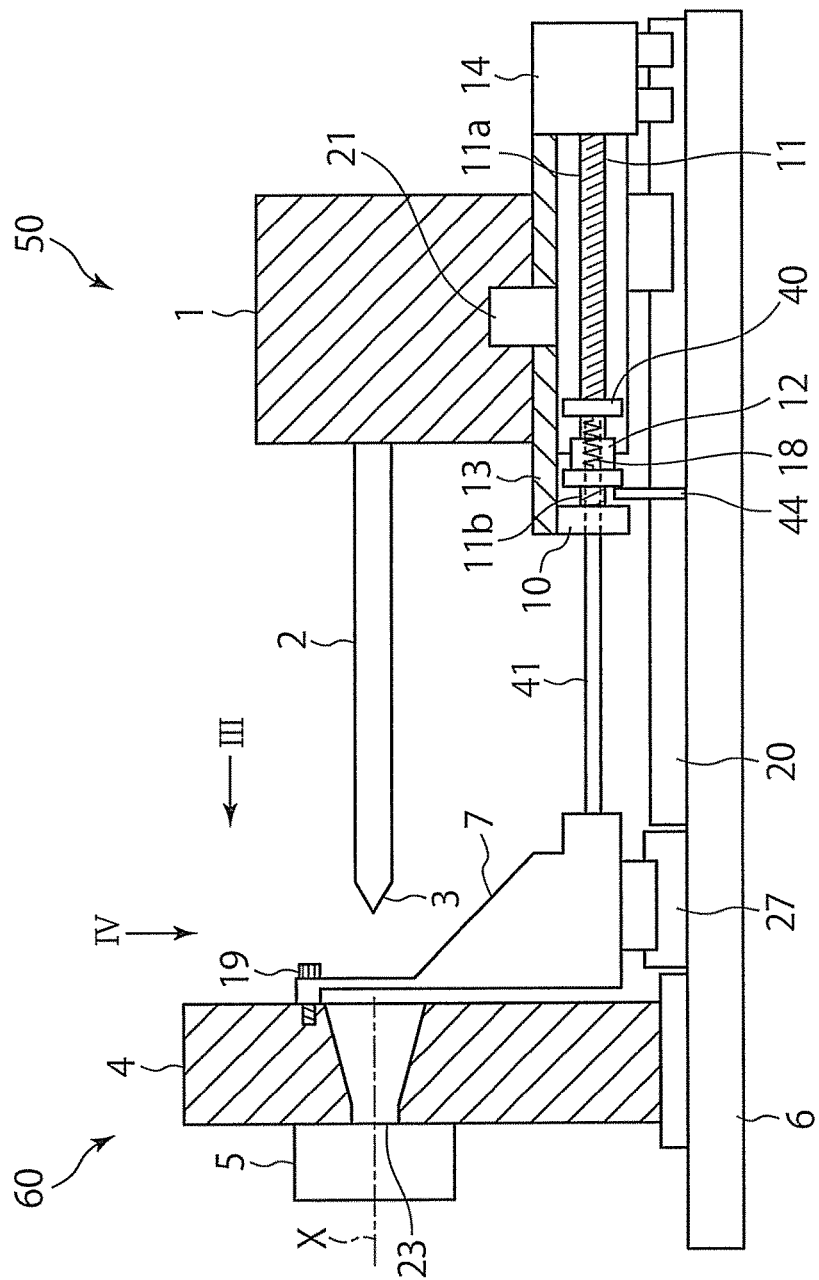
FIG. 1 is a schematic view of a nozzle touch mechanism according to a first embodiment of the present invention (in a state where no nozzle touch force is applied).
Figure 2:
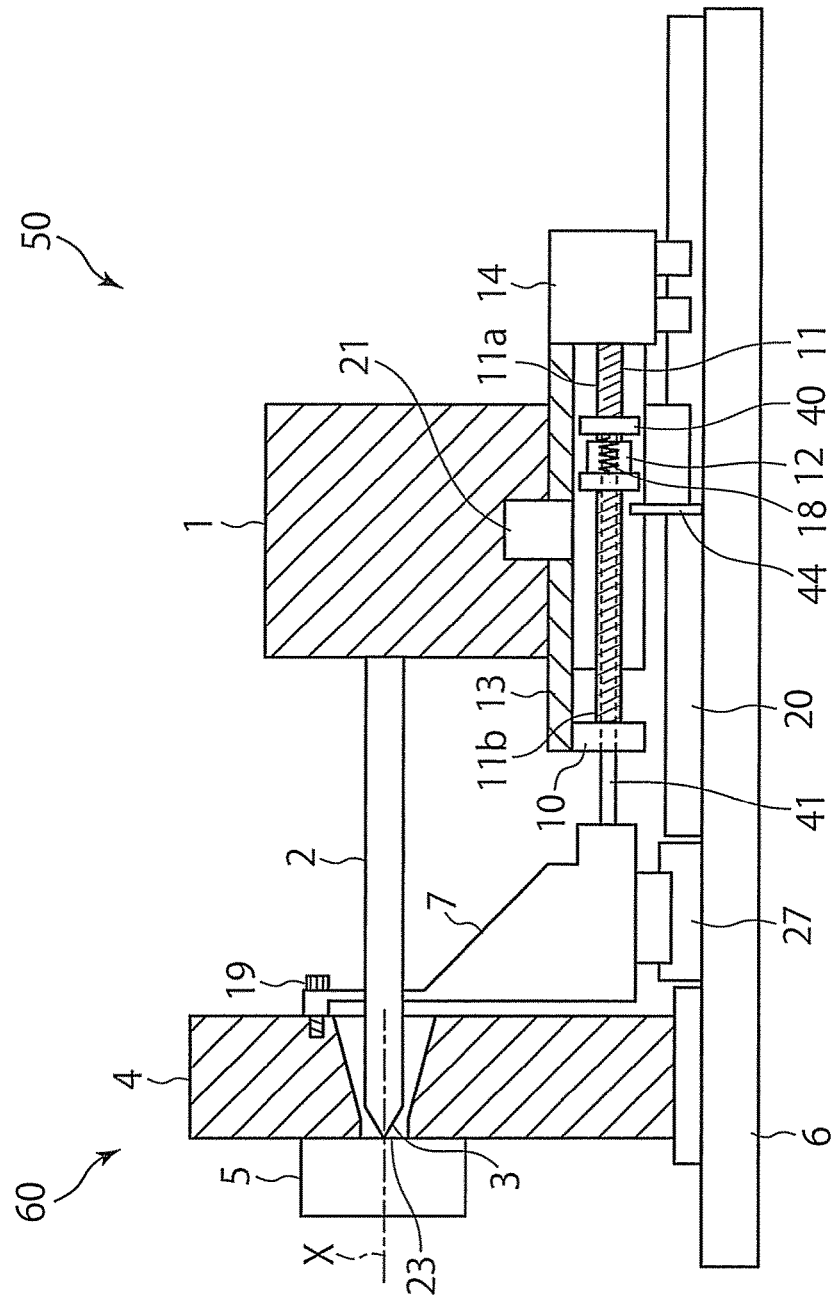
FIG. 2 is a schematic view of the nozzle touch mechanism according to the first embodiment of the present invention (in a state where the nozzle touch force is applied).
Figure 3:
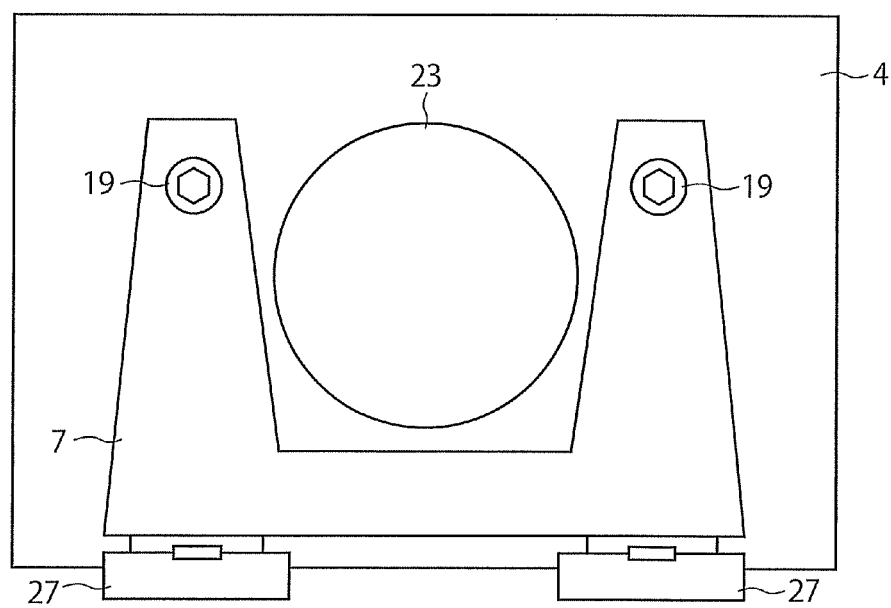
FIG. 3 illustrates the configuration of a connection mechanism as viewed from a direction of arrow III in FIG. 1.
Figure 4:
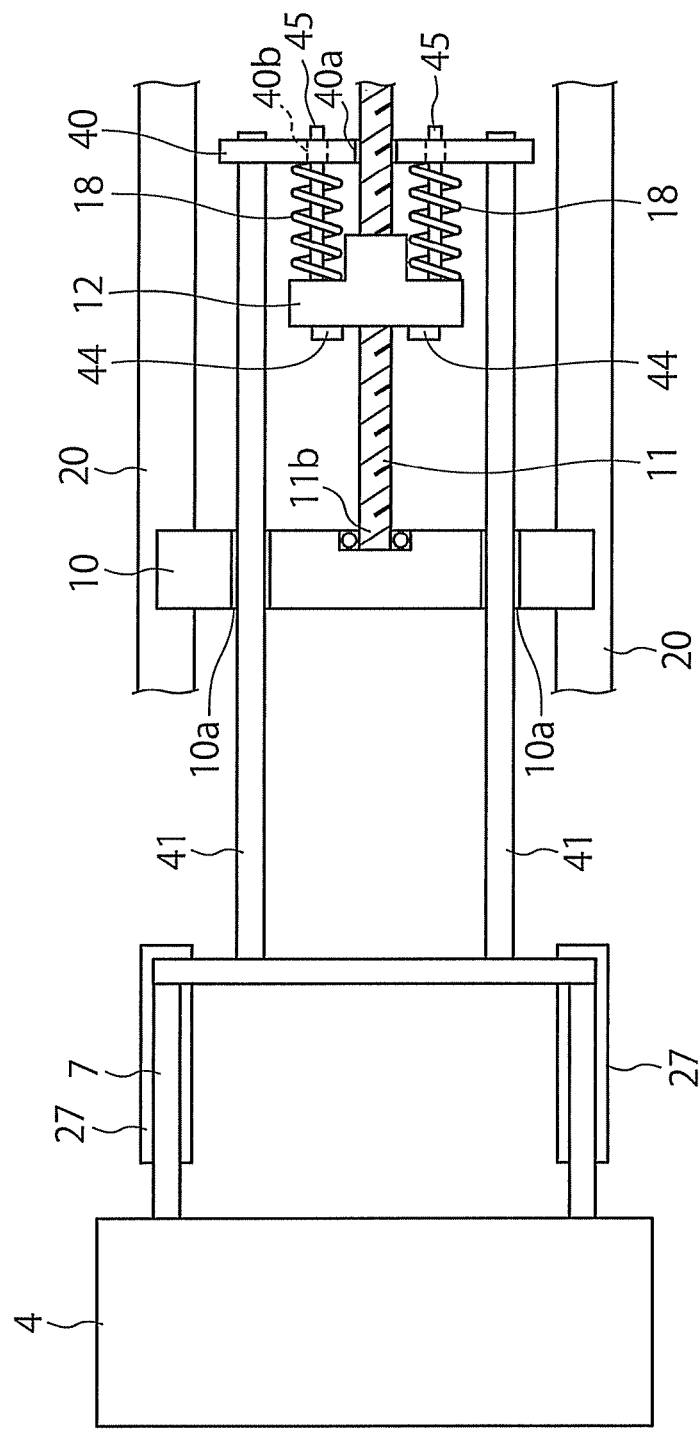
FIG. 4 is an enlarged top view of the nozzle touch mechanism as viewed from a direction of arrow IV in FIG. 1.

FIGS. 1 and 2 are schematic views of the nozzle touch mechanism of the injection molding machine according to the first embodiment of the present invention. FIG. 1 illustrates a state where no nozzle touch force is applied to a mold from a nozzle. FIG. 2 illustrates a state where a nozzle touch force is applied to the mold from the nozzle. FIG. 3 illustrates a configuration of a connection mechanism as viewed from the direction of arrow III in FIG. 1. FIG. 4 is a schematic top view illustrating the circumference of the connection mechanism and elastic bodies, as viewed from the direction of arrow IV in FIG. 1.

As illustrated in FIGS. 1 to 4, a nozzle touch mechanism 50 includes a base frame 6 and a stationary platen 4 fixed onto the base frame 6. A mold 5 is attached to the stationary platen 4.

The stationary platen 4 has a nozzle insertion hole 23 for bringing a nozzle 3 into contact with a spool of the mold 5 attached to the stationary platen 4 and allowing the nozzle 3 to press the stationary platen 4.

Figure 5:
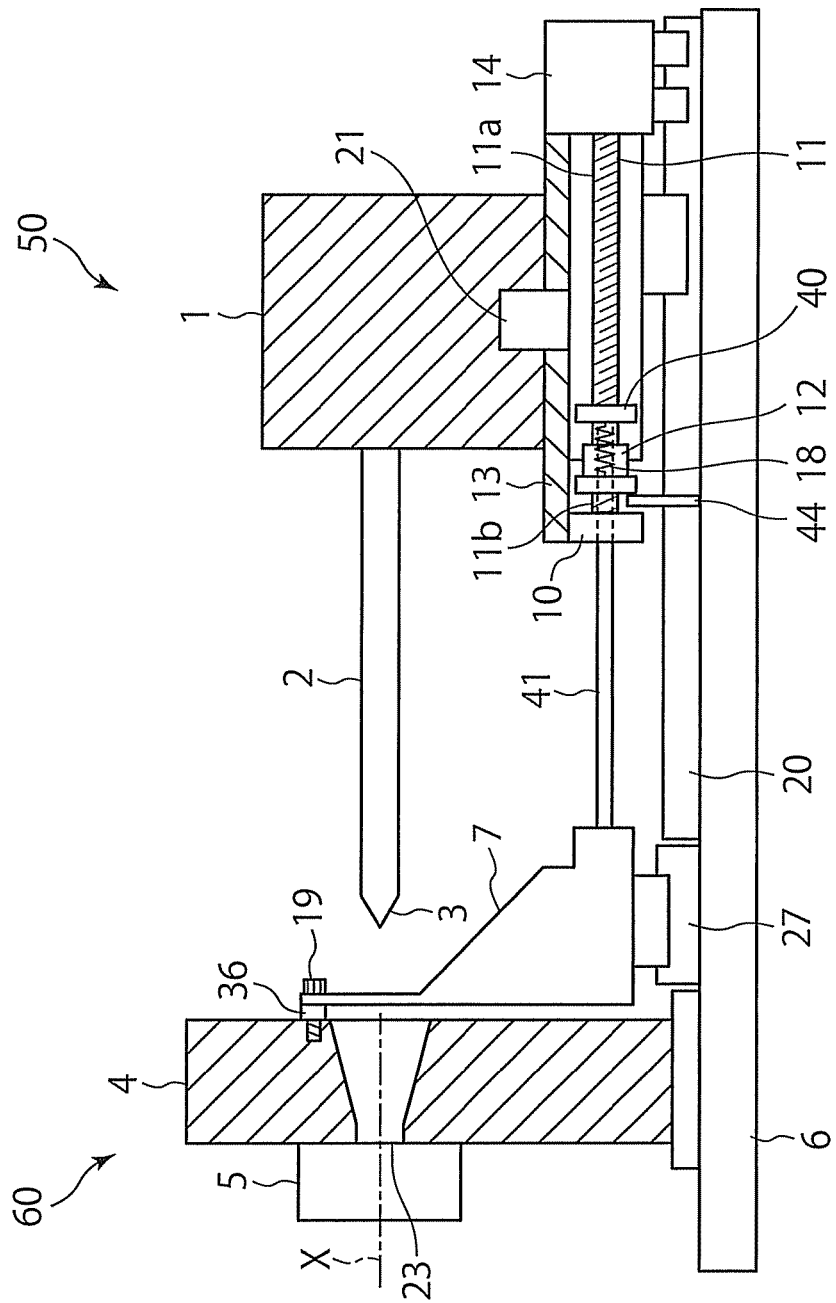
FIG. 5 is a schematic view illustrating a modified example of the nozzle touch mechanism (the state where no nozzle touch force is applied).

Further, the stationary platen 4 is directly connected to a connection mechanism 7 by means of a bolt (a connection member) 19 or indirectly via a block (an object) 36 (refer to FIG. 5). In this case, a support (the position of the bolt 19 or the block 36) where the stationary platen 4 is connected to the connection mechanism 7 is located above an axis X (or the center of the nozzle 3) which passes the center of the nozzle insertion hole 23 and which is horizontal to the base frame 6.

Rods 41 have one ends fixedly connected to the connection mechanism 7 and the other ends to which a nut portion 12 is connected via an attachment plate 40 and springs 18 described later. The nut portion 12 is supported by the attachment plate 40 and the rods 41 so as not to move it from a retaining position (refer to FIG. 4) toward the stationary platen 4 with respect to the base frame 6. The nut portion 12 is screwed with a ball screw shaft 11 (a movement mechanism) so as not to be revolvable. The nut portion 12 is screwed with the ball screw shaft 11 so as to be movable in the longitudinal direction of the ball screw shaft 11 with respect to the ball screw shaft 11.

The ball screw shaft 11 has one end 11a connected to a motor portion 14 (a drive mechanism).

A bearing unit 10 is connected to the other end 11b of the ball screw shaft 11. The bearing unit 10 supports the ball screw shaft 11 so as to be movable in a rotational direction but not to be movable in an axial direction. The bearing unit 10 is fixed to the front portion of a base 13 and is reciprocatable together with the base 13 in the longitudinal direction of the ball screw shaft 11. When the bearing unit 10 reciprocates in the longitudinal direction of the ball screw shaft 11, the ball screw shaft 11 reciprocates in the longitudinal direction as well.

The connection mechanism 7 is supported on the base frame 6 in such a manner that it can reciprocate in the longitudinal direction of the ball screw shaft 11 along guide rails 27 (a guide mechanism) installed on the base frame 6.

The connection mechanism 7 is prevented from floating with respect to the base frame 6 as a result. The ball screw shaft 11 is deterred from being bent as well.

The base 13 is configured to be reciprocatable integrally with the bearing unit 10 in the longitudinal direction of the ball screw shaft 11 along the guide rails 20 installed on the base frame 6.

The injection mechanism 1 is placed on the base 13, the injection mechanism 1 being connected with the base 13 by means of a pin 21 serving as a turning shaft. The injection mechanism 1 is installed on the base frame 6 movably in such a direction as to move it toward and away from the stationary platen 4.

The motor portion 14 is mounted to the base 13. The motor portion 14 applies a pressing force (a nozzle touch force) to the mold 5 from the nozzle 3 by making the injection mechanism 1 via the base 13 move. The motor portion 14 is movably installed on the guide rail 20 or fixedly installed on the base 13 so that the motor portion 14 can move horizontally to the base frame 6.

The injection mechanism 1 reciprocates in the direction of the stationary platen 4 together with the base 13 as a result of the motor portion 14 being driven. The injection mechanism 1 can rotate on the base 13 with the pin 21 as the center.

A heating cylinder 2 is attached to the injection mechanism 1 so as to extend toward the stationary platen 4. The heating cylinder 2 has the nozzle 3 at its leading end.

As illustrated in FIG. 4, the connection mechanism 7 and the ball screw shaft 11 are connected to each other via the rods 41, an attachment plate 40, springs (elastic bodies) 18 and the nut portion 12.

The bearing unit 10 is supported at the other end 11b of the ball screw shaft 11 via a bearing not shown. The bearing unit 10 is formed with through-holes 10a through which the rods 41 passes. The attachment plate 40, connected to the other ends of the rods 41, is supported by the base frame 6. The attachment plate 40 further has a through-hole 40a adapted to receive the ball screw shaft 11 that passes through the through-hole 40a and through-holes 40b adapted to receive spring rods 45 that pass through the through-holes 40b.

In this case, the spring 18 is disposed around the spring rod 45 and between the attachment plate 40 and the nut portion 12. Holding members 44 are jutted out the upper surface of the base frame 6. If the pressing force (the nozzle touch force) is not applied to the mold 5 from the nozzle 3 (refer to FIGS. 1 and 4), the nut portion 12 is in contact with the holding members 44 that retains and holds the nut portion 12.

When the pressing force (the nozzle touch force) is not applied to the mold 5 from the nozzle 3, the nut portion 12 is retained and held by the holding members 44, and a preload is added to the springs 18. Thus, the attachment plate 40 and the rods 41 are pulled to the side opposite to the mold 5 with respect to the stationary platen 4.

When the pressing force (the nozzle touch force) is not applied to the mold 5 from the nozzle 3 by the motor portion 14 (in FIG. 1), the springs 18 play a role of pressing the connection mechanism 7 in such a direction (the right direction in FIG. 1) as to move it away from the stationary platen 4 with respect to the base frame 6.

The preload is added to the springs 18 in advance. When the nozzle touch force is not applied to the mold 5 (FIG. 1), the reaction force of the preload (the spring force) of the springs 18 cancels out moment which is caused by the weight of the mold 5 and acts on the stationary platen 4. Thus, the stationary platen 4 is kept perpendicular to the base frame 6 while being attached with the mold 5. Alternatively, the holding members 44 may be movable along the longitudinal direction of the ball screw shaft 11 to vary the distance between the holding members 44 and the attachment plate 40, thereby making the value of the preload adjustable.

The nozzle touch mechanism 50 as described above and a mold clamping mechanism not shown are included in the injection molding machine 60. The present embodiment also provides such an injection molding machine 60.

A description is next given on the operation of the injection molding machine according to the first embodiment.

The stationary platen 4 is kept perpendicular to the base frame 6 in the state where the mold 5 is not attached to the stationary platen 4.

The mold 5 is next attached to the stationary platen 4.

The connection mechanism 7 is next directly attached to the stationary platen 4 by means of the bolt 19 or indirectly via the block 36 (refer to FIG. 5). The position (the support) where the stationary platen 4 is attached to the connection mechanism 7 or the block 36 is a predetermined position (described later).

As described above, the stationary platen 4 has exerted moment to tilt it toward the mold 5 (the left direction in FIG. 1) with respect to the base frame 6 in the state where the mold 5 is attached to the stationary platen 4 by the weight of the mold 5.

To deal with such moment in the present embodiment, the springs 18 are installed which make it possible to press the connection mechanism 7 in such a direction as to move it away from the stationary platen 4 with respect to the base frame 6.

Because of the addition of the preload, the springs 18 press the attachment plate 40 and the rods 41 toward the injection mechanism 1 and provide the action of pulling the connection mechanism 7 in such a direction as to move it away from the stationary platen 4.

In other words, the reaction force of the preload of the springs 18 produces such moment to allow the attachment plate 40 and the rods 41 to pull the stationary platen 4 toward the injection mechanism 1 via the connection mechanism 7, the bolt 19, and the like. The moment acting on the stationary platen 4 caused by the weight of the mold 5 cancels out in the state where no nozzle touch force is applied, due to such moment as to allow the attachment plate 40 and the rods 41 to pull the stationary platen 4 toward the injection mechanism 1 via the connection mechanism 7, the bolt 19 and the like. Thus the stationary platen 4 can be kept perpendicular to the base frame 6.

Figure 21:
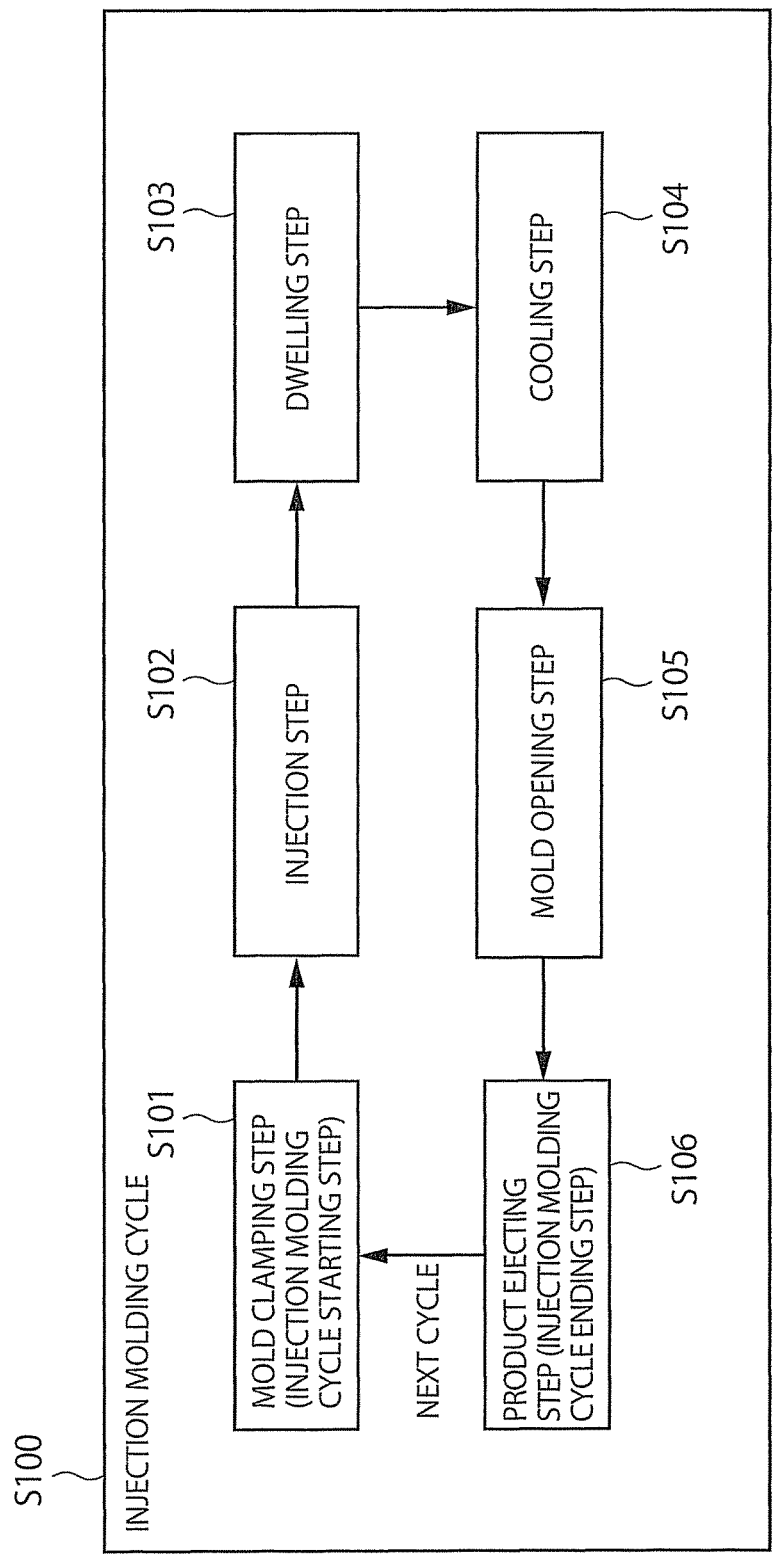
FIG. 21 is an explanatory view of a general injection molding cycle.

The stationary platen 4 in the present embodiment is perpendicular to the base frame 6 (FIG. 2) as well when the nozzle touch force is applied to the mold 5 from the nozzle 3 during a mold clamping step S101 or at the time of ending of the mold clamping step S101 (refer to FIG. 21).

Specifically, the motor portion 14 is first driven to move the injection mechanism 1 forward when the mold clamping step S101 or at the time of ending of the mold clamping step S101.

In this regard, the forward movement of the injection mechanism 1 means that the injection mechanism 1 moves in such a direction as to approach the stationary platen 4.

The ball screw shaft 11 is thereby rotated. The ball screw shaft 11 and the motor portion 14 are moved in such a direction as to approach the stationary platen 4 by the rotation of the ball screw shaft 11 since the nut portion 12 is supported by the base frame 6 via the attachment plate 40.

The injection mechanism 1, along with the bearing unit 10 and the base 13, moves forward toward the stationary platen 4 as a result.

The nozzle 3 located at the leading end of the heating cylinder 2 attached to the injection mechanism 1 comes into contact with the mold 5 and further presses it to produce the nozzle touch force.

The reaction force of the nozzle touch force allows the ball screw shaft 11 to move the nut portion 12 toward the motor portion 14 to press the attachment plate 40 (because of shrinking the springs 18), which pulls the rods 41 in such a direction as to move it away from the stationary platen 4. At this time, the nut portion 12 moves it away from the holding members 44.

The connection mechanism 7 is pulled toward the injection mechanism 1 by the nozzle touch force as a result.

The stationary platen 4 is also pulled toward the injection mechanism 1 by the nozzle touch force mentioned above since the stationary platen 4 is supported by the connection mechanism 7 directly or via the block 36. The stationary platen 4 is subjected to such moment as to be pulled toward the injection mechanism 1 due to the nozzle touch force mentioned above.

The position of the point of effort of moment which pulls the stationary platen 4 toward the injection mechanism 1 at this time depends on the support at which the stationary platen 4 and the connection mechanism 7 or the block 36 are connected to each other.

Moment which pulls the stationary platen 4 toward the mold 5 is, meanwhile, generated at the stationary platen 4 by the nozzle touch force applied to the mold 5, the moment being such that the position of the central axis of the nozzle insertion hole 23 is the position of the point of effort, since the mold 5 is attached to the stationary platen 4.

The position of the fulcrum point of the moment applied to the stationary platen 4 is the bottom of the stationary platen 4.

Therefore, the support at which the stationary platen 4 and the connection mechanism 7 or the block 36 are connected to each other is above the axis X which passes the center of the nozzle insertion hole 23, the axis X being horizontal to the base frame 6. Thus, the moment resulting from the nozzle touch force generated as a result of the force of the ball screw shaft 11 which pulls the connection mechanism 7 is greater than the moment resulting from the nozzle touch force applied to the mold 5 by a height from the axis X which passes the center of the nozzle insertion hole 23, the axis X being horizontal to the base frame 6.

However, the position of the support at which the stationary platen 4 and the connection mechanism 7 or the block 36 are connected to each other is determined so as to be equal to the moment which is generated due to the weight of the mold 5 and which acts on the stationary platen 4.

A difference between the moment resulting from the nozzle touch force generated due to the force of the ball screw shaft 11 which pulls the connection mechanism 7 and the moment resulting from the nozzle touch force applied to the mold 5 is equal to the moment generated due to the weight of the mold 5 and acting on the stationary platen 4.

The moment, which is caused by the difference between the two types of moment: the first one resulting from the nozzle touch force generated by the force of the ball screw shaft 11 which pulls the connection mechanism 7 and the second one which results from the nozzle touch force applied to the mold 5, and which pulls the stationary platen 4 toward the injection mechanism 1 is cancelled by the moment generated due to the weight of the mold 5 and acting on the stationary platen 4.

In short, the moment which tilts the stationary platen 4 toward the mold 5 is equal to the moment which tilts the stationary platen 4 toward the injection mechanism 1.

The stationary platen 4 maintains the vertical state with respect to the base frame 6.

The stationary platen 4 is accordingly perpendicular to the base frame 6 even when the nozzle touch force is applied. Moreover, the mold 5 attached to the stationary platen 4 is perpendicular to the base frame 6 as well.

The stationary platen 4 and the mold 5 attached to the stationary platen 4 maintain the vertical state with respect to the base frame 6 by means of the nozzle touch force from the mold closing operation or from the end of the mold clamping operation in the mold clamping step S101 (refer to FIG. 21), through the injection step S102, the dwelling step S103, and the cooling step 104, until the start of the mold opening step S105, i.e., until the end of the application of the nozzle touch force.

The injection molding cycle S100 may continuously be performed. That is to say, the injection molding operation may continuously be performed. In such a case, the stationary platen 4 and the mold 5 attached to the stationary platen 4 continuously maintain the vertical state with respect to the base frame 6 by the nozzle touch force in some cases from the mold closing operation or from the end of the mold clamping operation in the first mold clamping step S101 of the continuous operation of the injection molding cycle S100 until the end of the continuous operation of the injection forming cycle S100, i.e., until the end of the application of the nozzle touch force before the start of the mold opening step S105 at the time when the continuous operation of the injection molding cycle S100 is completed.

Figure 6:
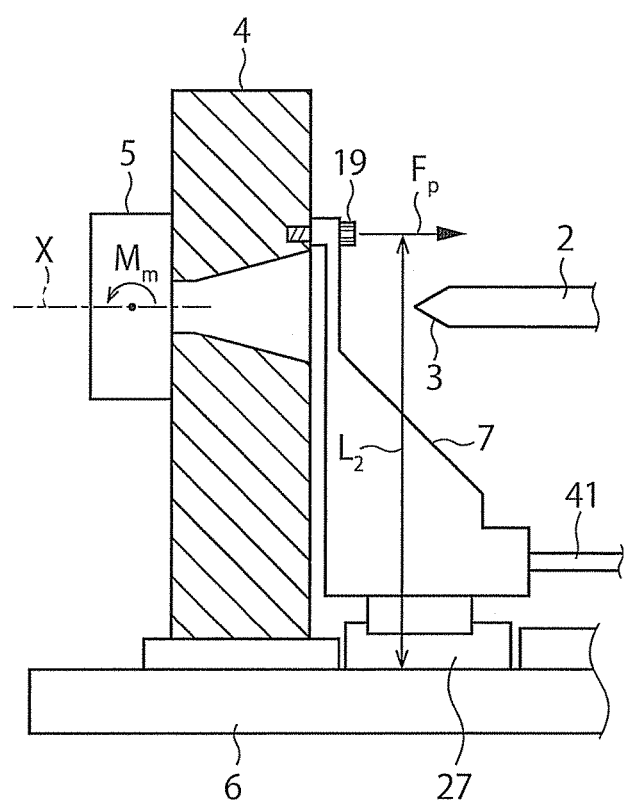
FIG. 6 illustrates moment applied to a stationary platen in the state where no nozzle touch force is applied.
Figure 7:
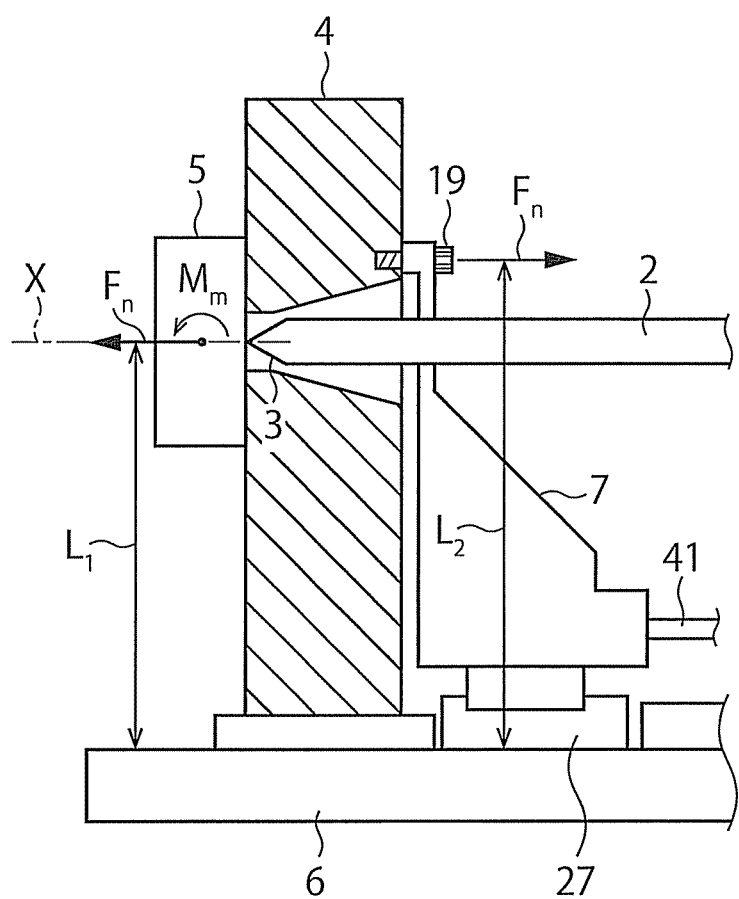
FIG. 7 illustrates moment applied to the stationary platen in the state where the nozzle touch force is applied.

A description is given on how to obtain the height position of the support at which the stationary platen 4 and the connection mechanism 7 or the block 36 are connected to each other with reference to FIGS. 6 and 7.

The moment which is caused by the weight of the mold 5 and which acts on the stationary platen 4 is cancelled by means of the reaction force of the preload (the spring force) of the spring 18 when no nozzle touch force is applied to the mold 5. The stationary platen 4 is accordingly maintained perpendicularly to the base frame 6.

The conditions of the moment acting on the stationary platen 4 to be cancelled as described above are as below (refer to FIG. 6).

$$F_p L_2 = M_m \quad \text{Equation (1)}$$

where $F_p$ is the magnitude of the preload (the spring force) of the spring 18; $L_2$ is a distance from the upper surface of the base frame 6 to the support at which the stationary platen 4 and the connection mechanism 7 or the block 36 are connected to each other; and $M_m$ is moment generated by the weight of the mold 5.

On the other hand, when the nozzle touch force is applied to the mold 5, the moment generated by the weight of the mold 5 and acting on the stationary platen 4 is canceled by the nozzle touch force. Specifically, when the nozzle touch force is applied to the mold 5, the moment generated by the weight of the mold 5 and acting on the stationary platen 4 is canceled due to the difference between the moment resulting from the nozzle touch force generated by the force of the ball screw shaft 11 pulling the connection mechanism 7 and the moment resulting from the nozzle touch force applied to the mold 5. The stationary platen 4 is maintained perpendicularly to the base frame 6 as a consequence.

The conditions of the moment acting on the stationary platen 4 to be canceled are as below (refer to FIG. 7).

$$F_n L_1 + M_m = F_n L_2 \quad \text{Equation (2)}$$

where $F_n$ is the magnitude of a nozzle touch force; and $L_1$ is a distance from the upper surface of the base frame 6 to the center of the nozzle 3.

From the above equations (1) and (2), $$L_2 = L_1 \times F_n / (F_n - F_p) \quad \text{Equation (3)}$$

As described above, $L_1$, which is a distance from the upper surface of the base frame 6 to the center of the nozzle 3, can previously be calculated and is a known value. $F_n$, which is also used as a specification value of the injection mechanism 1, can previously be calculated and can be a known value. Moreover, $F_p$, which can be calculated theoretically from the structure of the spring 18 or the like in advance, is a known value. $L_2$ can be calculated according to the above-mentioned equation (3). The distance from the upper surface of the base frame 6 to the support at which the stationary platen 4 and the connection mechanism 7 or the block 36 are connected to each other is determined in this manner.

A description is next given on the advantages of the nozzle touch mechanism of the injection molding machine according to the present embodiment.

The nozzle touch mechanism 50 according to the present embodiment is such that the connection mechanism 7 is connected to the stationary platen 4 at the support located above the center of the nozzle 3. The spring 18 is installed in the nozzle touch mechanism 50, the spring 18 making it possible to press the connection mechanism 7 in such a direction as to move it away from the stationary platen 4 with respect to the base frame 6 when the nozzle touch force from the nozzle 3 is not applied to the mold 5 through the motor portion 14.

It is possible to prevent the tilt of the stationary platen 4 and the mold 5 attached to the stationary platen 4 not only for the period of time during which the nozzle touch force is applied to the mold 5 from the nozzle 3 but also for the period of time during which no nozzle touch force is applied.

The tilt (bending moment) of the stationary platen 4 is avoided as above while no nozzle touch force is applied, resulting in the stationary platen 4 prevented from being continuously subjected to a load. The stationary platen 4 will not be deformed due to aged deterioration at the same time. Moreover, the mold 5 can be opened and closed without being damaged in the state (for the period of time) where no nozzle touch force is applied as well.

The tilt of the stationary platen 4 and the mold 5 attached to the stationary platen 4 is prevented during the application of the nozzle touch force, and the stationary platen 4 accordingly maintains the vertical state with respect to the base frame 6 during the mold opening and closing. The mold 5 and its guide pin and the like as a result will not be subjected to any damage.

Various modified examples of the present embodiment will be described below with reference to FIGS. 8 to 13. The same portions in FIGS. 8 to 13 as those in FIGS. 1 to 7 are attached with like reference numerals and their detailed explanations are omitted.

FIGS. 8 to 12 illustrate the configurations where the height-wise position of the support is adjustable by means of an elevation device or other ones. That is to say, the stationary platen 4 and the connection mechanism 7 or the block 36 are connected to each other at a fixed position with respect to the height direction in the embodiment illustrated in FIGS. 1 to 7. However, the invention is not limited to this. As illustrated in FIGS. 8 to 12, the support at which the stationary platen 4 and the connection mechanism 7 or the block 36 are connected to each other may be adjustable in the Z-axial direction, i.e., in a direction perpendicular to the base frame 6. In this manner, a support at which the stationary platen 4 and the connection mechanism 7 or the block 36 are connected to each other in accordance with the weight of the mold can be obtained more easily in each case even if the weight of the mold 5 changes due to the replacement of the mold. It is further possible to more easily adjust the position of the support at which the stationary platen 4 and the connection mechanism 7 or the block 36 are connected to each other.

Figure 8:
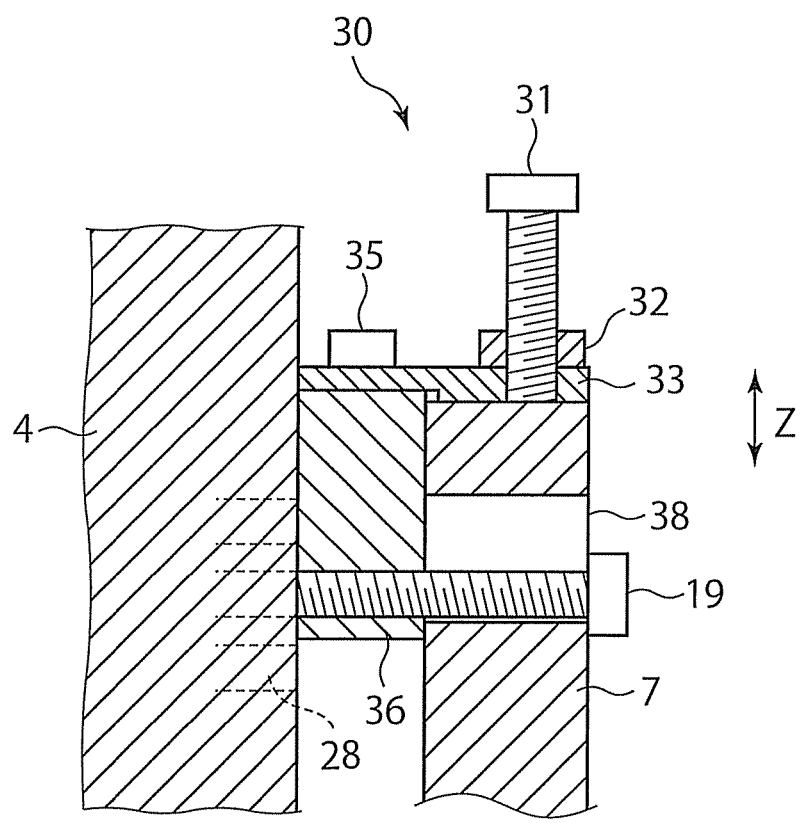
FIG. 8 is an enlarged view of an elevation device for adjusting the height-wise position of a support.
Figure 9:
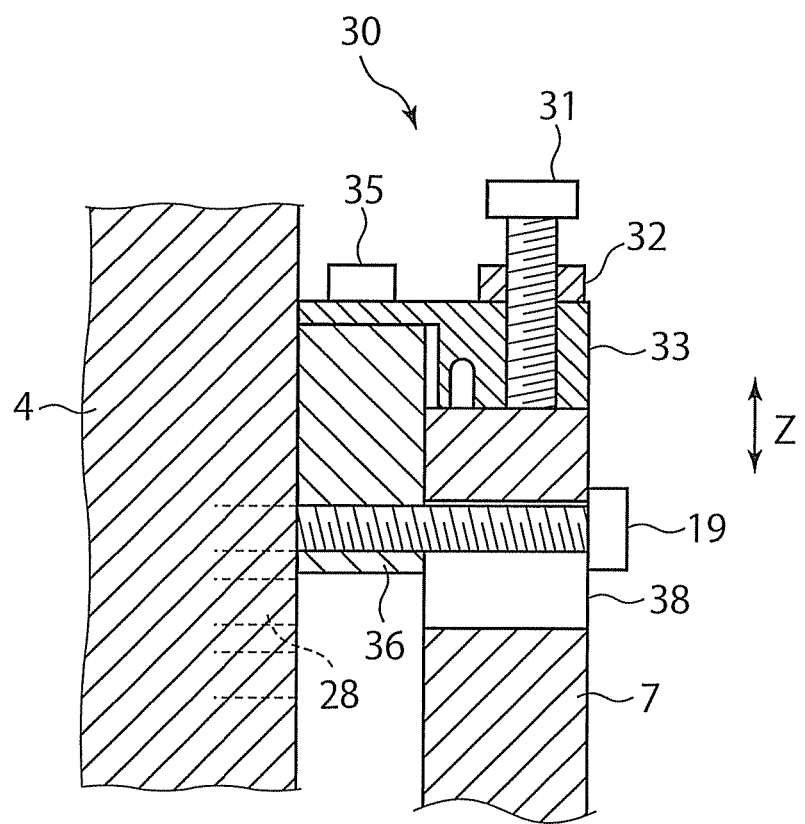
FIG. 9 is an enlarged view illustrating a case of raising a block by the use of the elevation device illustrated in FIG. 8.

For example, as illustrated in FIGS. 8 and 9, an elevation device such as a jack portion 30 (a screw type) may be attached to the connection mechanism 7 or the stationary platen 4 and operated to adjust a position (a support) at which the stationary platen 4 and the connection mechanism 7 or the block 36 are connected to each other.

Specifically, the jack portion 30 as one example of the elevation device is attached to the connection mechanism 7 or the stationary platen 4. An adjusting bracket 33 serving as a constituent part of the jack portion 30 and the block 36 are connected by means of a bolt 35. Reference numerals 31 and 32 denote a screw and a nut, respectively.

Such operation as jacking-up to the jack portion 30 moves the block 36 in the Z-axial direction, i.e., in a direction perpendicular to the base frame 6 in order to adjust the attachment position of the block 36. The above-mentioned bolts 19, inserted into the block 36, are designed to be movable along a long hole 38 of the connection mechanism 7 in the Z-axial direction (the up-down direction) with respect to the connection mechanism 7. In addition, the stationary platen 4 is formed with a plurality of attachment holes 28 along the up-down direction (the Z-axial direction). A leading end portion of the bolt 19 is screwed the attachment hole 28.

The conventional technology of the screw type jack is employed in the operation of the jack portion 30 in this case and thus the detailed explanation is omitted.

Figure 10:
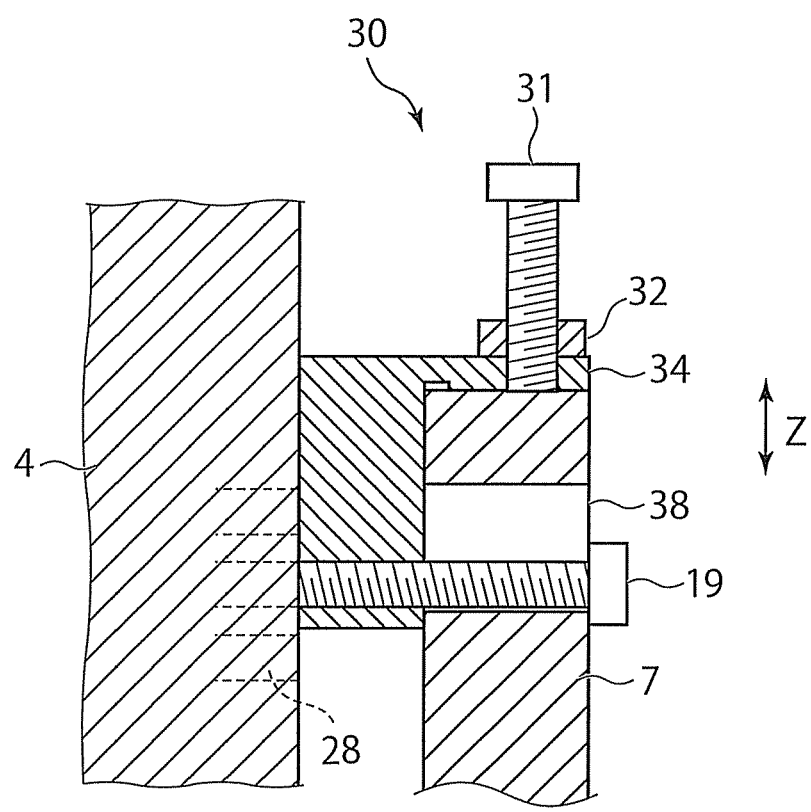
FIG. 10 is an enlarged view illustrating a modified example of the elevation device.

An elevation device illustrated in FIG. 10 may be used in place of that explained in FIGS. 8 and 9. In FIG. 10, a block 34 is used which is configured to integrally include the adjusting bracket 33 and the block 36 illustrated in FIGS. 8 and 9. This block 34 may be moved in the Z-direction, i.e., in a direction perpendicular to the base frame 6 through the operation of the elevation device such as the jack portion 30, thereby adjusting the attachment position of the block 34.

Figure 11:
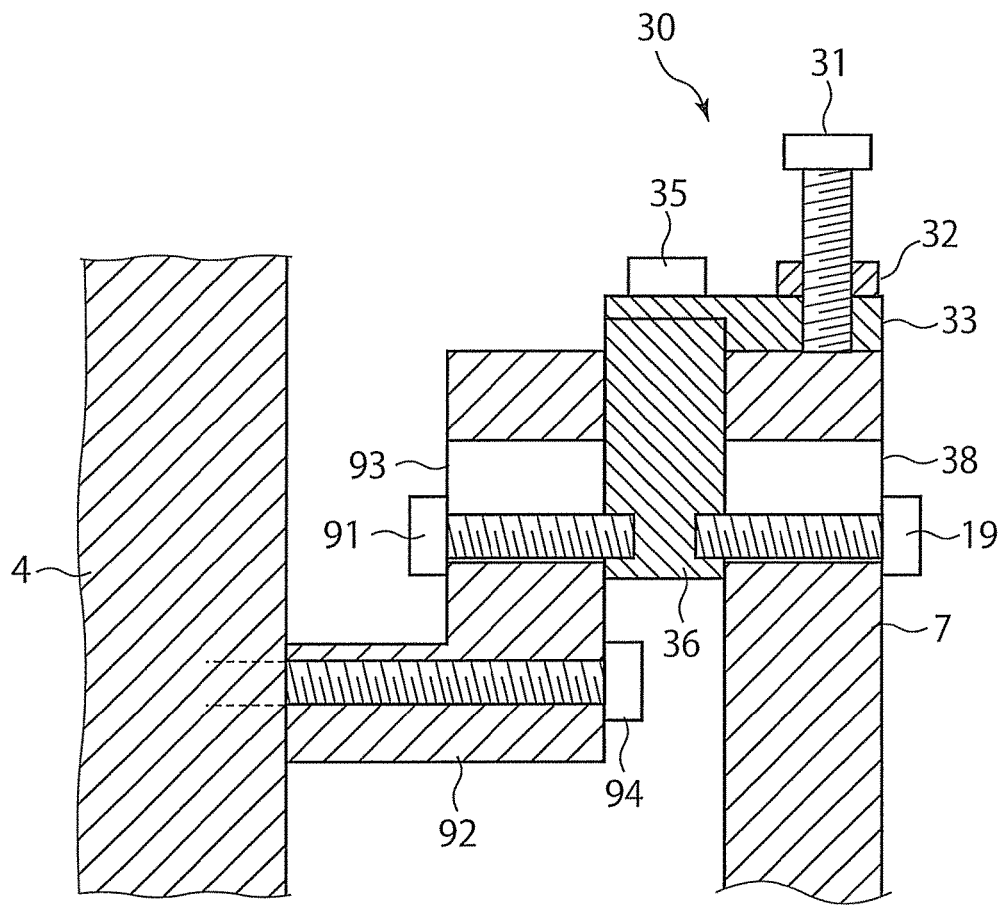
FIG. 11 illustrates another modified example of the elevation device.

An elevation device illustrated in FIG. 11 may be used alternatively. In FIG. 11, another connection mechanism (a second connection mechanism) 92 is installed between the stationary platen 4 and the block 36. This second connection mechanism 92 is connected to the stationary platen 4 by means of a bolt 94. In this case, a contact position between the second connection mechanism 92 and the block 36 and a contact position between the block 36 and the connection mechanism 7 may be located above the axis X which is parallel to the base frame 6, the axis X passing the center of the nozzle insertion hole 23. In such a case, the connection position between the second connection position 92 and the stationary platen 4 may be located below the axis X which is parallel to the base frame 6, the axis X passing the center of the nozzle insertion hole 23.

The second connection mechanism 92 has a nearly L-shape in cross-section. The vertical section of the nearly L-shape is formed with a long hole 93 similarly to the connection mechanism (the first connection mechanism) 7. A bolt 91, which is inserted into the long hole 93 of the second connection mechanism 92 from the stationary platen 4 side, is screwed a stationary platen 4 side surface of the block 36. Meanwhile, the bolt 19 is inserted into the long hole 38 of the connection mechanism 7 from the injection mechanism 1 side is screwed the connection mechanism 7 side surface of the block 36.

Such operation as jacking-up to the jack portion 30 integrally moves the block 36, the bolt 19 and the bolt 91 in the up-down direction to adjust the position of the support in FIG. 11.

In FIGS. 8 to 11 some methods such as an ordinary screw jack, a ratchet screw jack and a bearing-attached screw jack have been known as screw type jack operating methods for the jack portion 30 (the screw type), and the present invention may use any of the operating methods.

The screw type is used as the means for operating the jack portion 30 in FIGS. 8 to 11. However, the present invention is not limited to this. Any operating means such as a hydraulic type, a pneumatic type, and a rack-drive type can be employed as means for operating the jack portion 30.

In other words, the method for moving the block 36 and the block 34 in a Z direction, i.e., in a direction perpendicular to the base frame 6 by use of the jack portion 30 is not particularly restrictive.

The jack is used as the elevation device in FIGS. 8 to 11; however, the elevation device is not limited to the jack, that is, it is not particularly restrictive. The elevation device may be any one that can be installed on the connection mechanism 7 or the stationary platen 4 and that can move the block 36 and the block 34 in the Z direction, i.e., in the direction perpendicular to the base frame 6.

Figure 12:
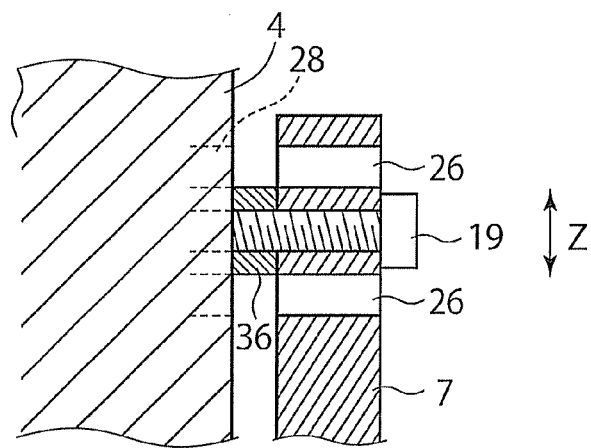
FIG. 12 is an enlarged view illustrating another modified example of the elevation device.

Alternatively, the connection mechanism 7 may be provided with a plurality of screw holes 26 for the bolt 19 as illustrated in FIG. 12. The plurality of screw holes 26 are arranged at predetermined intervals in the Z-axial direction, i.e., in the direction perpendicular to the base frame 6 at respective positions above the axis X (the center of the nozzle 3) which is horizontal to the base frame 6, the axis X passing the center of the nozzle insertion hole 23. The stationary platen 4 is formed with attachment holes 28 at respective positions corresponding to the screw holes 26 of the connection mechanism 7. Further, the block 36 is interposed between the stationary platen 4 and the connection mechanism 7. Such a configuration enables the attachment position (the support) of the bolt 19 or the block 36 to be adjusted by selecting a predetermined screw hole 26 and attachment hole 28.

The plurality of screw holes 26 and attachment holes 28 do not need to be arranged at given intervals. An interval between the respective screw holes 26 and between the respective attachment holes 28 can be either constant or non-constant.

The support at which the connection mechanism 7 and the stationary platen 4 are connected to each other is located on the stationary platen 4 side as viewed from the connection mechanism 7 in the above description. However, the present invention is not limited to this. For example, as illustrated in FIG. 13, the support at which the connection mechanism 7 and the stationary platen 4 are connected to each other may be located on the injection mechanism 1 side as viewed from the connection mechanism 7.

Figure 13:
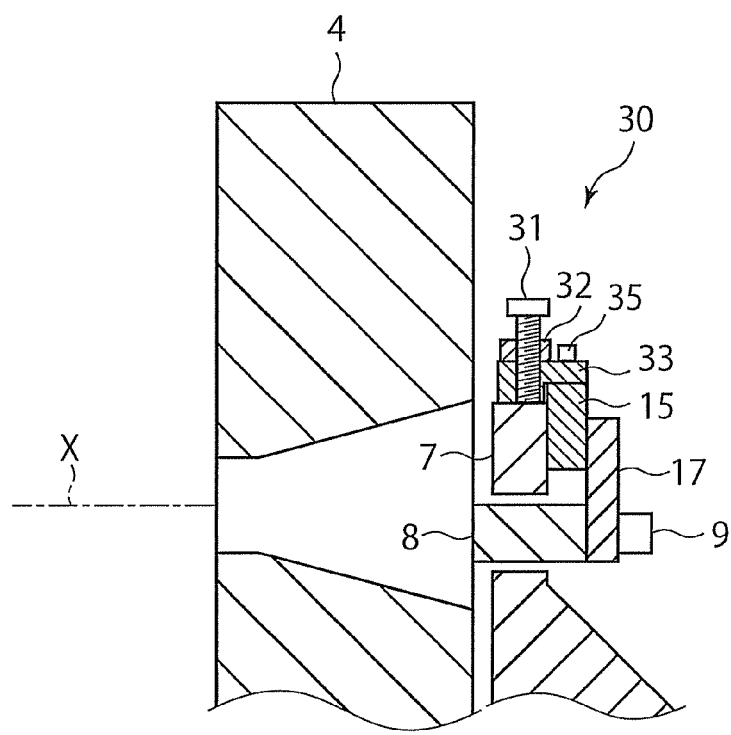
FIG. 13 is an enlarged view illustrating a modified example of the nozzle touch mechanism.

Specifically, a connection part 17 in FIG. 13 is connected to the stationary platen 4 via a connection pipe 8 by means of a bolt 9. The connection pipe 8 is disposed in such a manner as to pass through the connection mechanism 7. The connection part 17 is supported by the connection mechanism 7 via the block 15 (the object). In this case, if the contact position between the connection part 17 and the block 15 and the contact position between the block 15 and the connection mechanism 7 are located above the axis X which passes the center of the nozzle insertion hole 23 and which is parallel to the base frame 6, the connection position between the connection pipe 8 and the stationary platen 4 may be located below the axis X which passes the center of the nozzle insertion hole 23 and which is parallel to the base frame 6.

An elevation device such as the jack portion 30 (the screw type) is further attached to the connection mechanism 7 and operated to adjust the attachment position of the block 15. To be specific, the jack portion 30 is attached to the connection mechanism 7 and the adjusting bracket 33 which is constituent parts of the jack portion 30 and the block 15 are connected by means of the bolt 35. The configuration of the jack portion 30 is almost the same as that illustrated in FIGS. 8 to 12, and hence, the detailed explanation is omitted.

In this case, the support at which the connection mechanism 7 and the stationary platen 4 are connected to each other depends on the position of the block 15, that is, it is located on the injection mechanism 1 side as viewed from the connection mechanism 7.

Second Embodiment

Figure 14:
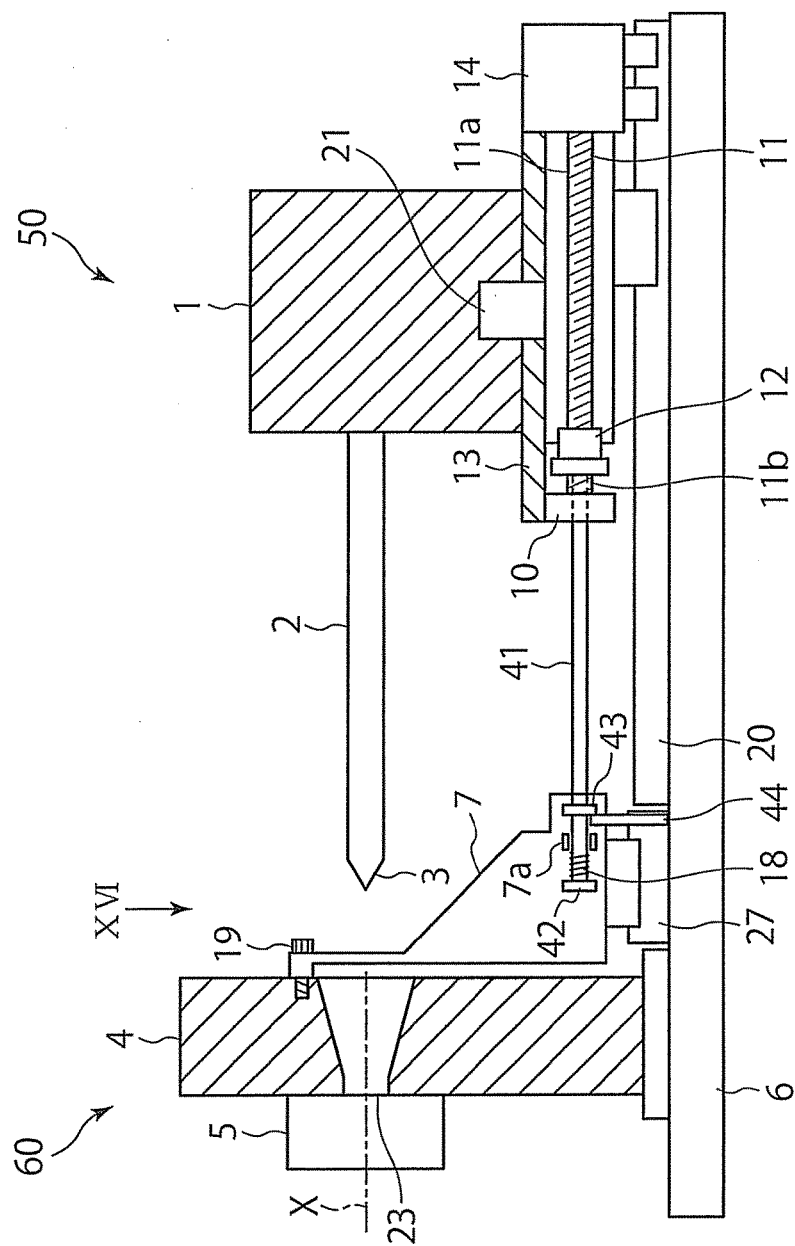
FIG. 14 is a schematic view of a nozzle touch mechanism according to a second embodiment of the present invention (in a state where no nozzle touch force is applied).
Figure 15:
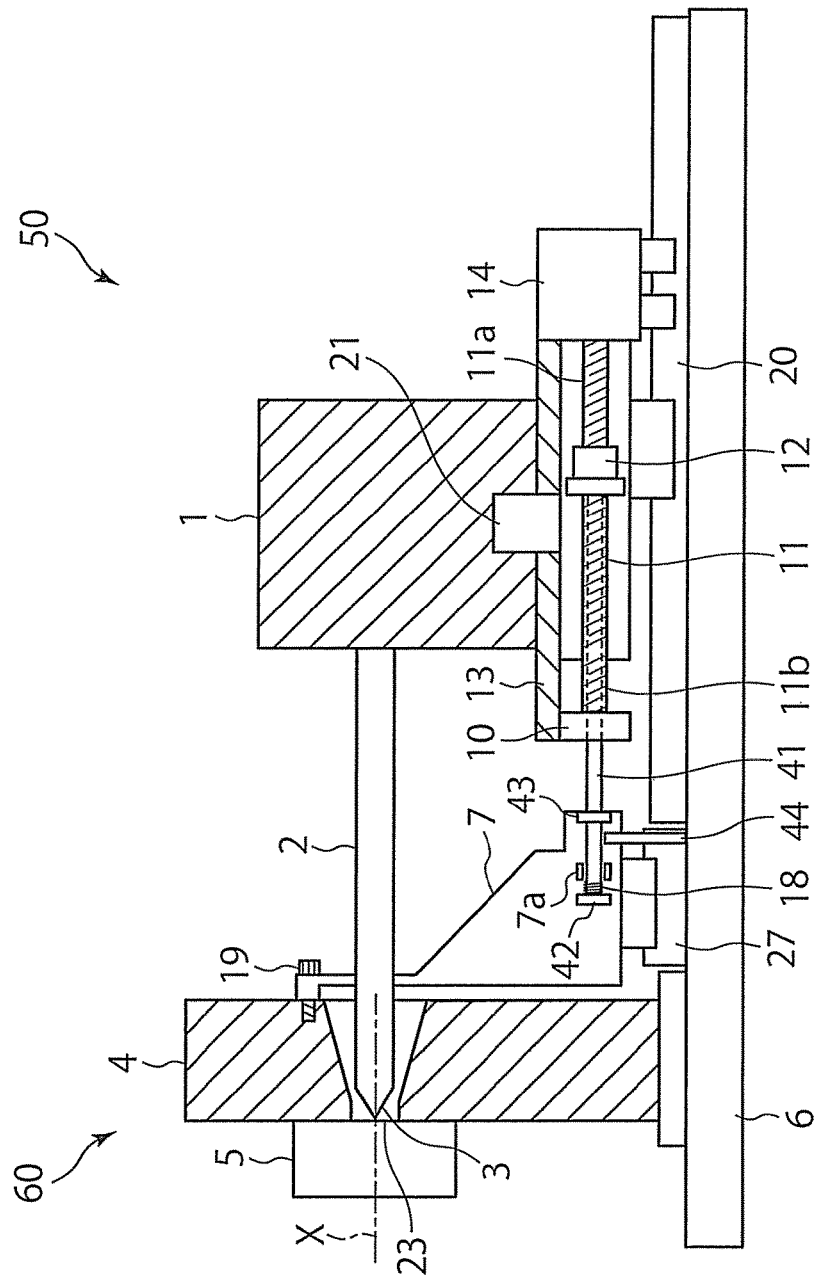
FIG. 15 is a schematic view of the nozzle touch mechanism according to the second embodiment of the present invention (in a state where the nozzle touch force is applied).

A second embodiment of the present invention will now be described with reference to FIGS. 14 to 16 that illustrate the second embodiment of the present invention. FIG. 14 among these figures illustrates a state where no nozzle touch force is applied to a mold from a nozzle; FIG. 15 illustrates a state where the nozzle touch force is applied to the mold from the nozzle; and FIG. 16 is a schematic top view illustrating a configuration of a connection mechanism as viewed from a direction of arrow XVI in FIG. 14.

Figure 16:
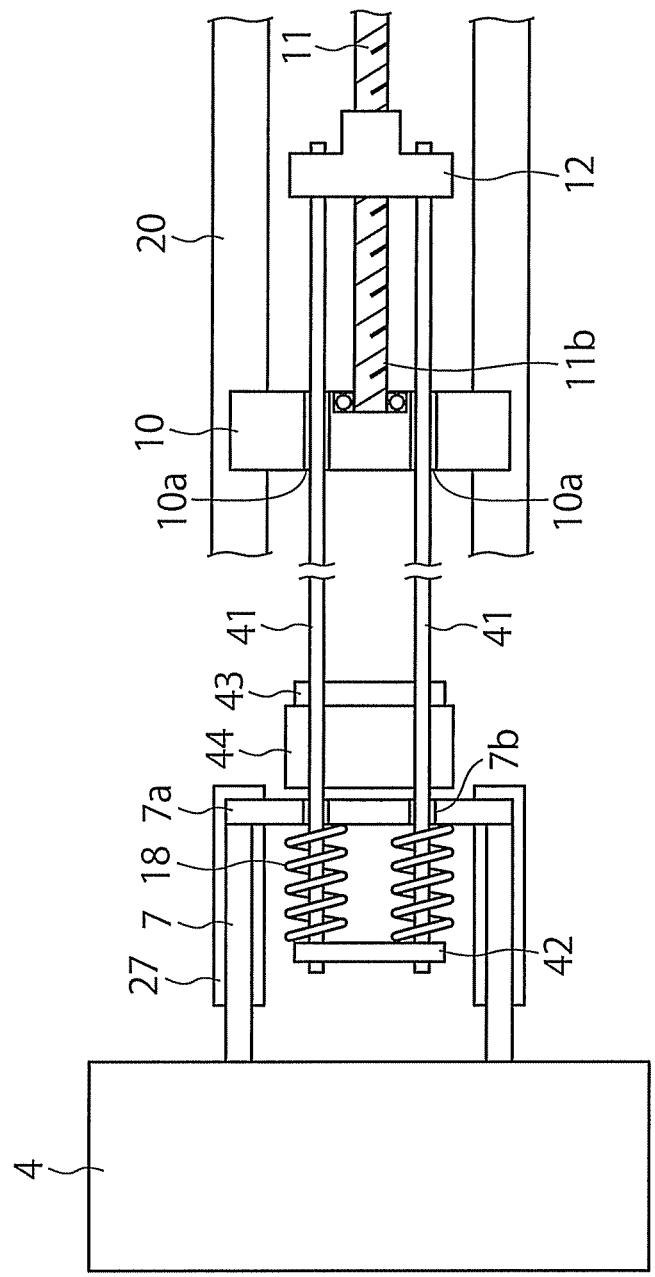
FIG. 16 is an enlarged top view illustrating the nozzle touch mechanism as viewed from the direction of arrow XVI in FIG. 14.

The second embodiment illustrated in FIGS. 14 to 16 is different from the first embodiment in the perspective of the attachment position of the spring 18 and the configuration around the ball screw shaft 11. The other configurations are almost the same as those of the first embodiment. In FIGS. 14 to 16, the same portions as those in the first embodiment are attached with like reference numerals and their detailed explanations are omitted.

In the nozzle touch mechanism 50 illustrated in FIGS. 14 to 16, a nut portion 12 is connected to the connection mechanism 7 via springs 18 and rods 41. The nut portion 12 is screwed with the ball screw shaft 11 and is supported by the rods 41. The nut portion 12 is supported by the base frame 6 or is movably disposed above while it is away from the base frame 6.

The bearing unit 10, connected to the other end 11b of the ball screw shaft 11, is fixed to the front portion of the base 13 and designed to be able to reciprocate in the longitudinal direction of the ball screw shaft 11 along with the base 13.

The connection mechanism 7 and the ball screw shaft 11 are connected via the springs (elastic bodies) 18, the attachment plate 42, the rods 41 and the nut portion 12 in the present embodiment. The spring 18 has one end attached to the connection mechanism 7 and the other end attached to the ball screw shaft 11 via the attachment plate 42, the rods 41, and the nut portion 12.

The bearing unit 10 is formed with through-holes 10a through which rods 41 pass (refer to FIG. 16). The attachment plate 42 is connected to the other ends of the rods 41. The connection mechanism 7 has a connection plate 7a extending in a direction perpendicular to the moving direction of the nozzle 3. The connection plate 7a is formed with through-holes 7b through which rods 41 pass.

In this case, the springs 18 are each disposed around the rod 41 at a position between the attachment plate 42 and the connection plate 7a. Specifically, the spring 18 has one end attached to the connection plate 7a of the connection mechanism 7 and the other end attached to the ball screw shaft 11 via the attachment plate 42 and the rod 41.

As described above, the connection mechanism 7 is connected to the ball screw shaft 11 sequentially via the springs 18, the attachment plate 42, the rods 41 and the nut portion 12.

A retaining plate 43 is fixed to the middle of the rods 41. A holding member 44 is further jutted out the upper surface of the base frame 6.

The rods 41, the nut portion 12 and the ball screw shaft 11 are pulled by the springs 18 toward the stationary platen 4 in this case when a pressing force (a nozzle touch force) is not applied to the mold 5 from the nozzle 3.

At this time, the retaining plate 43 comes into contact with the holding member 44; therefore, the ball screw shaft 11 is retained by the holding member 44 via the nut portion 12, the rods 41, and the retaining plate 43. A preload is added to the springs 18 accordingly.

When the pressing force (the nozzle touch force) is not applied from the nozzle 3 to the mold 5 by the motor portion 14 (FIG. 14), the springs 18 play a role of making it possible to press the connection mechanism 7 in such a direction (the right direction in FIG. 14) as to move it away from the stationary platen 4 with respect to the base frame 6.

A preload is added to the spring 18 in advance. When no nozzle touch force is applied to the mold 5 (FIG. 14), moment generated due to the weight of the mold 5 and acting on the stationary platen 4 is canceled by means of the reaction force of the preload (the spring force) of the spring 18. The stationary platen 4 is then maintained perpendicularly to the base frame 6 in the state where the mold 5 is attached to the stationary platen 4.

On the other hand, when the nozzle touch force is applied to the mold 5 from the nozzle 3 (FIG. 15), the ball screw shaft 11 pulls the connection mechanism 7 by the nozzle touch force against the force of the springs 18 in such a direction as to move it away from the stationary platen 4. Also in this case, similarly to the embodiment illustrated in FIGS. 1 to 7, the stationary platen 4 is maintained perpendicularly to the base frame 6 by the nozzle touch force applied to the mold 5 from the nozzle 3.

Figure 17:
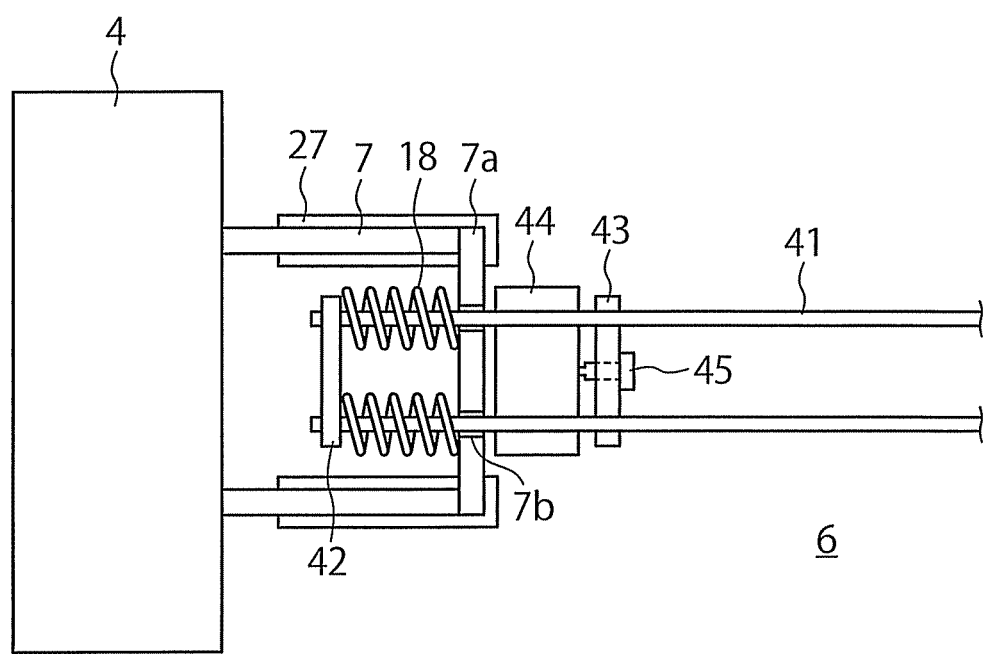
FIG. 17 is an enlarged top view illustrating a preload adjusting mechanism.

FIG. 17 illustrates a configuration where a preload adjusting mechanism that adjusts the preload of the spring 18 is installed, the configuration being explained in FIGS. 14 to 16.

Specifically, the retaining plate 43 is provided with a preload adjusting screw (a preload adjusting mechanism) 45 in FIG. 17. In this case, the preload adjusting screw 45 revolves appropriately to change a distance between the retaining plate 43 and the holding member 44. The attachment plate 42 accordingly moves toward or away from the connection plate 7a, thereby making adjustable the value of the preload added to the spring 18.

The present invention is not limited to the preload adjusting mechanism illustrated in FIG. 17. For example, the preload adjusting mechanism may be a mechanism which adjusts the position of the holding member 44 with respect to the base frame 6. Alternatively, the preload adjusting mechanism may be a mechanism which adjusts the attachment position of the retaining plate 43 with respect to the rod 41. Further alternatively, the preload adjusting mechanism may be a mechanism configured to combine these mechanisms.

Figure 18:
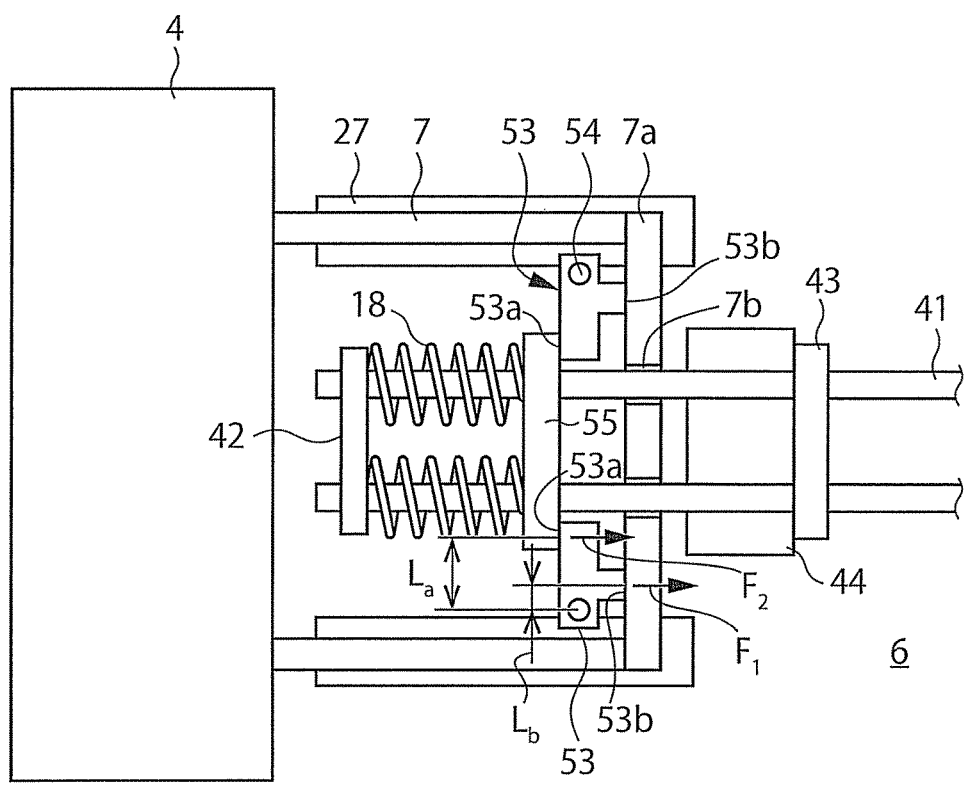
FIG. 18 is an enlarged top view of a booster mechanism.

FIG. 18 illustrates a configuration where a booster mechanism that strengthens the preload (the spring force) caused by the springs 18 is installed, the configuration being explained in FIGS. 1 to 7 or FIGS. 14 to 17.

Specifically, nearly T-shaped turning members (booster mechanisms) 53 are installed on the upper surface of the base frame 6, the rotating member 53 being adapted to increase the preload caused due to the springs 18 alone and transmit the increased preload to the connection mechanism 7. In this case, the turning member 53 is rotatable with respect to the base frame 6 around a rotation pin (a pivot) 54 extending perpendicularly to the base frame 6.

The pressing plate 55 is fixed to the rods 41. The springs 18 are held between the attachment plate 42 and the pressing plate 55.

The turning member 53 further has a first contact portion 53a which comes into contact with the pressing plate 55 and a second contact portion 53b which comes into contact with the connection plate 7a of the connection mechanism 7.

In this case, a distance $L_a$ from the rotation pin 54 to the first contact portion 53a is longer than a distance $L_b$ from the rotation pin 54 to the second contact portion 53b ($L_a > L_b$). If the preload of the spring 18 alone is assumed as $F_2$ and the force applied from the turning member 53 to the connection plate 7a is assumed as $F_1$, the equation will be: $F_1 = F_2 \times L_a / L_b$. The force applied to the connection plate 7a can be increased in this way.

Third Embodiment

Figure 19:
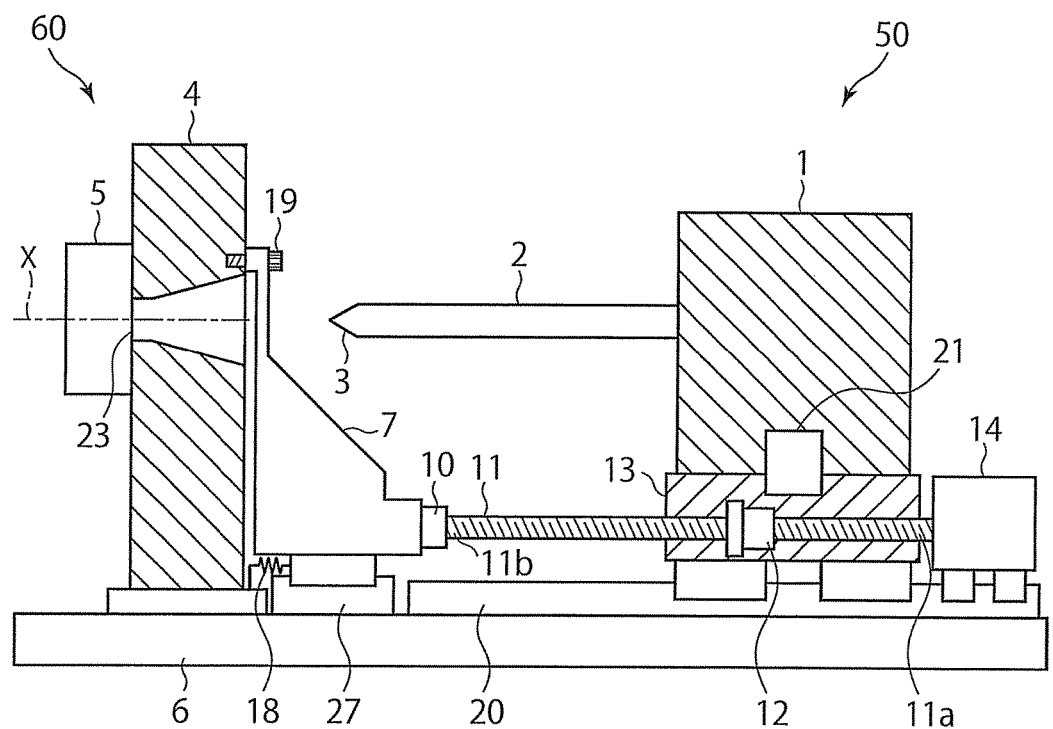
FIG. 19 is a schematic view of a nozzle touch mechanism according to a third embodiment of the present invention (in a state where no nozzle touch force is applied).

A third embodiment of the present invention will now be described with reference to FIGS. 19 and 20 which illustrate the third embodiment of the present invention. FIG. 19 among these figures illustrates a state where no nozzle touch force is applied from a nozzle to a mold; and FIG. 20 illustrates a state where a nozzle touch force is applied from the nozzle to the mold.

Figure 20:
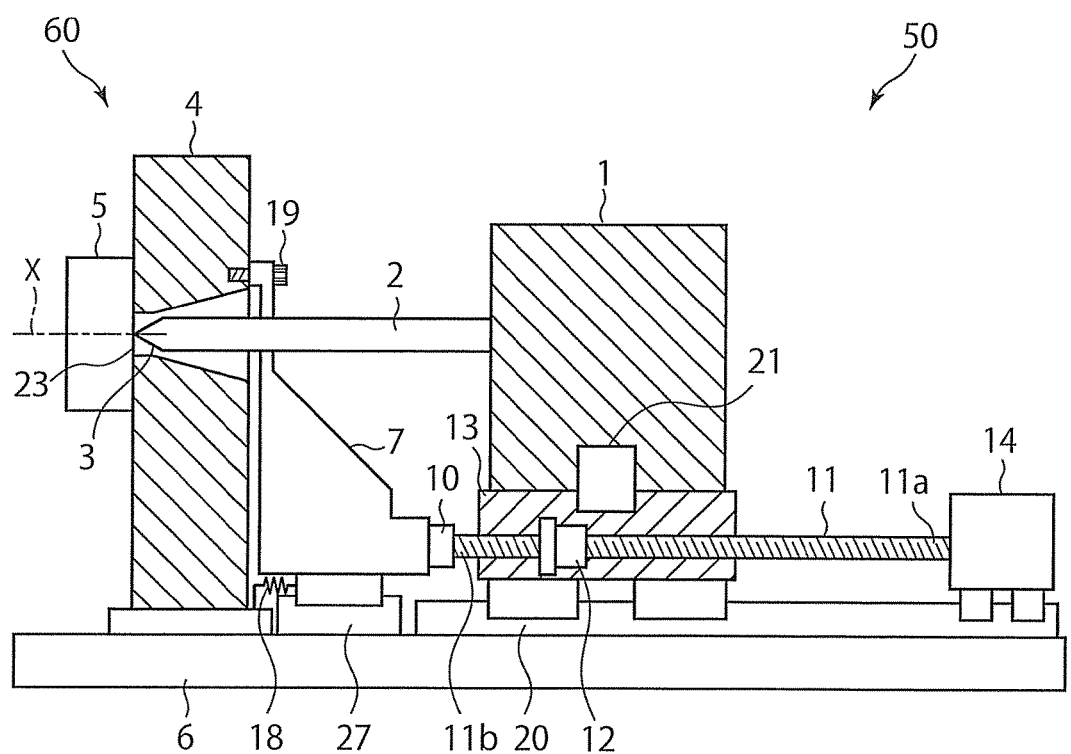
FIG. 20 is a schematic view of the nozzle touch mechanism according to the third embodiment of the present invention (in a state where the nozzle touch force is applied).

The third embodiment illustrated in FIGS. 19 and 20 is different from the first and second embodiments in the attachment position of the spring 18 and the configuration around the ball screw shaft 11. The other configurations are almost the same as those of the first and second embodiments. In FIGS. 19 and 20, the same portions as those in the first and second embodiments are attached with like reference numerals and their detailed explanations are omitted.

The spring 18 has one end attached to the base frame 6 and the other end attached to the connection mechanism 7 in the nozzle touch mechanism 50 illustrated in FIGS. 19 and 20.

The nut portion 12 in FIGS. 19 and 20 is attached to the inside of the base 13 that is configured so as to be able to reciprocate along the guide rails 20 installed on the base frame 6 in the longitudinal direction of the ball screw shaft 11 independently from the motor portion 14.

The bearing unit 10 is directly fixed to the connection mechanism 7. The ball screw shaft (the movement mechanism) 11 is connected to the bearing unit 10. The spring (the elastic body) 18 has one end attached to the base frame 6 and the other end attached to the connection mechanism 7.

In this case, a preload is added to the spring 18, and the connection mechanism 7 is pressed by way of the reaction force of the spring 18 in such a direction (the rightward direction in FIG. 19) as to move it away from the stationary platen 4. Thus, moment acts on the stationary platen 4, the moment making the stationary platen 4 tilt in a direction (the rightward direction in FIG. 19) opposite to the mold 5 with respect to the base frame 6.

The moment which is generated by the weight of the mold 5 and which acts on the stationary platen 4 is accordingly canceled by the use of the reaction force of the preload (the spring force) of the spring 18. The stationary platen 4 can be maintained perpendicularly to the base frame 6 in the state where no nozzle touch force is applied.

On the other hand, when the nozzle touch force is applied from the nozzle 3 to the mold 5, the ball screw shaft 11 pulls the connection mechanism 7 by way of the nozzle touch force against the force of the springs 18 in such a direction as to move it away from the stationary platen 4. Also in this case, similarly to the first and second embodiments, the stationary platen 4 is maintained perpendicularly to the base frame 6 due to the nozzle touch force applied from the nozzle 3 to the mold 5.

Incidentally, it is possible to appropriately combine the plurality of constituent elements disclosed in the above embodiments and modified examples as necessary. Alternatively, some constituent elements may be omitted from all the constituent elements shown in the above embodiments and modified examples.

The invention claimed is:

1. A nozzle touch mechanism comprising:
   a base frame comprising a first guide mechanism and a second guide mechanism;
   a stationary platen fixed to the base frame, to which a mold is to be attached;
   an injection mechanism configured to move toward and away from the stationary platen;
   a nozzle attached to the injection mechanism;
   a movement mechanism configured to move the injection mechanism toward and away from the stationary platen;
   a drive mechanism connected to one end of the movement mechanism and configured to move along the second guide mechanism, the drive mechanism configured to apply a pressing force to the mold from the nozzle by making the injection mechanism move toward the stationary platen;
   a connection mechanism connected to another end of the movement mechanism and configured to reciprocate along the first guide mechanism, the connection mechanism being directly or indirectly connected to the stationary platen at a support located above a center of the nozzle; and
   an elastic body configured to press or pull the connection mechanism away from the stationary platen with respect to the base frame when no pressing force is applied to the mold from the nozzle by the drive mechanism, wherein one end of the elastic body is attached to the connection mechanism.

2. The nozzle touch mechanism according to claim 1, further comprising:
   a nut portion movable relatively to the movement mechanism, wherein the elastic body has the one end connected to the connection mechanism via a rod and another end attached to the nut portion.

3. The nozzle touch mechanism according to claim 1, further comprising:
   a nut portion movable relatively to the movement mechanism, wherein the elastic body has the one end connected to the connection mechanism via a rod and the nut portion and another end attached to the movement mechanism.

4. The nozzle touch mechanism according to claim 1, wherein the elastic body has another end attached to the base frame.

5. The nozzle touch mechanism according to claim 1, wherein an elevation device is provided on at least one of the connection mechanism and the stationary platen, the elevation device making adjustable a height-wise position of the support.

6. The nozzle touch mechanism according to claim 1, further comprising a preload adjusting mechanism configured to adjust a preload of the elastic body.

7. The nozzle touch mechanism according to claim 1, further comprising a booster mechanism configured to increase a preload of the elastic body.

8. An injection molding machine comprising the nozzle touch mechanism according to claim 1.

* * * * *